(12) United States Patent
Tamura (10) Patent No.: US 11,268,604 B2
(45) Date of Patent: Mar. 8, 2022

(54) GEAR DEVICE AND MANUFACTURING METHOD FOR GEAR DEVICE

(71) Applicant: SUMITOMO HEAVY INDUSTRIES, LTD., Tokyo (JP)

(72) Inventor: Mitsuhiro Tamura, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 156 days.

(21) Appl. No.: 16/838,572

(22) Filed: Apr. 2, 2020

(65) Prior Publication Data

US 2020/0325976 A1 Oct. 15, 2020

(30) Foreign Application Priority Data

Apr. 9, 2019 (JP) .............................. JP2019-074120

(51) Int. Cl.
*F16H 55/06* (2006.01)
*F16H 1/10* (2006.01)

(52) U.S. Cl.
CPC ............... *F16H 55/06* (2013.01); *F16H 1/10* (2013.01); *F16H 2055/065* (2013.01)

(58) Field of Classification Search
CPC ........... F16H 49/001; F16H 1/10; F16H 55/06
See application file for complete search history.

(56) References Cited

U.S. PATENT DOCUMENTS

| 3,161,081 | A | * | 12/1964 | Walton | F16H 49/001 |
| | | | | | 74/640 |
| 2018/0180154 | A1 | * | 6/2018 | Gilges | F16H 49/001 |
| 2018/0266533 | A1 | * | 9/2018 | Tamura | F16H 49/001 |
| 2020/0040981 | A1 | * | 2/2020 | Zhao | F16C 33/583 |

FOREIGN PATENT DOCUMENTS

JP 2018-155313 A 10/2018

\* cited by examiner

*Primary Examiner* — Terence Boes
(74) *Attorney, Agent, or Firm* — Michael Best & Friedrich LLP (57) ABSTRACT

A gear device includes an internal gear and an external gear that meshes with the internal gear, in which the internal gear is made of a resin, the external gear is made of a material having a smaller linear expansion coefficient than the resin, and PCDs of the internal gear and the external gear before use of the gear device are set such that lost motion becomes 0 min or more and 15 min or less due to a difference in a thermal expansion amount between the internal gear and the external gear at a time of use of the gear device.

18 Claims, 4 Drawing Sheets

GEAR DEVICE AND MANUFACTURING METHOD FOR GEAR DEVICE

RELATED APPLICATIONS

The content of Japanese Patent Application No. 2019-074120, on the basis of which priority benefits are claimed in an accompanying application data sheet, is in its entirety incorporated herein by reference.

BACKGROUND

Technical Field

Certain embodiments of the present invention relate to a gear device and a manufacturing method for a gear device.

Description of Related Art

A gear device having an external gear and an internal gear is known. The present applicant has disclosed a gear device that allows taking measures against heat generation of gears in the related art. The gear device is a bending meshing type gear device that includes an external gear which deforms flexibly and an internal gear which meshes with the external gear. One of the external gear and the internal gear is made of a resin. The other is made of a high thermal conductivity material having higher thermal conductivity than a resin.

SUMMARY

According to an aspect of the present invention, to solve the phenomenon, there is provided a gear device including an internal gear and an external gear that meshes with the internal gear. The internal gear is made of a resin. The external gear is made of a material having a smaller linear expansion coefficient than the resin. PCDs of the internal gear and the external gear before use of the gear device are set such that lost motion becomes 0 min or more and 15 min or less due to a difference in a thermal expansion amount between the internal gear and the external gear at a time of use of the gear device.

Any combination of the components described above and a combination obtained by switching the components and expressions of the present invention between methods and systems are also effective as an aspect of the present invention.

DETAILED DESCRIPTION

When one of the external gear and the internal gear is made of a resin in order to achieve weight saving of the gear device, a gap between the gears is widened at the time of use due to a difference in a linear expansion coefficient between a metal and the resin, thereby decreasing rotation accuracy.

It is desirable to provide a gear device capable of suppressing a decrease in rotation accuracy while achieving weight saving.

First, circumstances that led to the present invention will be described. The present inventor has examined a gear device having an external gear and an internal gear that mesh with each other, and obtained the following knowledge. In the gear device in which the resin internal gear is meshed with the external gear made of a material having a smaller linear expansion coefficient than the resin, circumferential play between the gears increases, and lost motion increases due to a difference in a thermal expansion amount in a state where a temperature has risen due to the use (hereinafter referred to as "at the time of use"). In the gear device, when the lost motion at the time of use is large, it is difficult to respond to applications requiring high accuracy, limiting applications in some cases.

The present inventor has found out that it is possible to respond also to applications requiring high accuracy insofar as the lost motion of the gear device at the time of use is within a range of 0 min or more to 15 min or less.

In addition, the present inventor has repeatedly examined and found out that when the internal gear is made of a resin, the gear device can be started comparable to a case of clearance-fitting also in a case where the internal gear and the external gear are meshed with each other in an interference-fitted state, in a state before a temperature rise caused by the use of the gear device occurs (hereinafter, referred to as "before use"). This is presumably because the resin internal gear has high flexibility and a surface thereof is easily and elastically deformed in response to compressive stress. Therefore, it can be said that it is possible to relatively flexibly set lost motion (or can also be expressed as a meshing state) before the temperature rise.

In addition, it is confirmed that lost motion at the time of use can be made small in a case where the internal gear and the external gear are meshed with each other in an interference-fitted state before use.

Based on the knowledge, the present inventor has reached a configuration of the present invention, in which PCDs of the internal gear and the external gear before use of the gear device are set with lost motion at the time of use as reference, in order to be able to respond also to applications requiring high accuracy. Hereinafter, content thereof will be described with reference to specific examples in executing the present invention.

Hereinafter, the present invention will be described based on suitable embodiments with reference to each of the drawings. In the embodiments and a modified example, the same or equivalent components and members will be assigned with the same reference symbols, and overlapping description will be omitted as appropriate. A dimension of a member in each drawing is enlarged or contracted as appropriate in order to facilitate understanding. In addition, some of members that are not important for describing the embodiments will be omitted in each of the drawings.

In addition, although terms including ordinal numbers, such as first and second, are used in order to describe various components, the terms are used only for distinguishing one component from other components, and the terms do not limit the components. In addition, separate components having a common point are distinguished by "first and second" being added to the beginning of names and "-A and

One Embodiment

Figure 1:
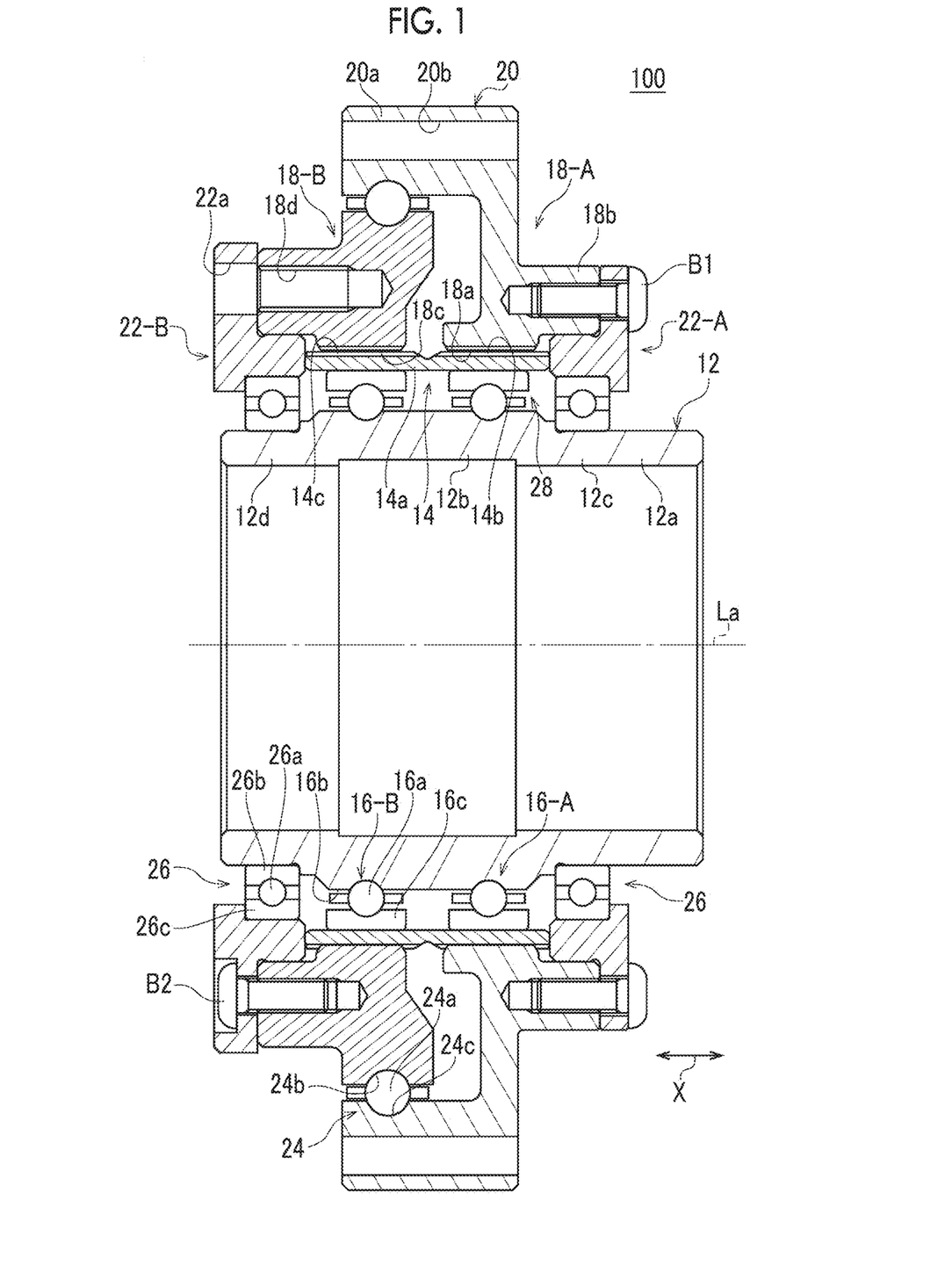
FIG. 1 is a side sectional view illustrating a gear device according to one embodiment.

First, an overall configuration of a gear device 100 according to one embodiment will be described. FIG. 1 is a side sectional view illustrating the gear device 100 according to the one embodiment. The gear device 100 is a bending meshing type gear device that rotates an external gear 14 by flexibly deforming and rotating the external gear 14, which meshes with internal gears 18-A and 18-B, and outputs an axial rotation component. The gear device of the embodiment is a so-called tubular bending meshing type gear device that decelerates and outputs the rotation of a wave generator 12 using the decelerating internal gear 18-A and the output internal gear 18-B.

The gear device 100 mainly includes the wave generator 12, the external gear 14, wave generator bearings 16-A and 16-B, the internal gears 18-A and 18-B, a support member 20, and bearing housings 22-A and 22-B. Hereinafter, a direction along a rotation center line La of the wave generator 12 will be simply referred to as an "axial direction X", and a circumferential direction and a radial direction around the rotation center line La will be simply referred to as a "circumferential direction" and a "radial direction" in some cases.

The wave generator 12 is a stiff tubular member, and functions as an input shaft to which rotation is input. Rotation is input to the wave generator 12 from a driving device such as a motor. A shaft hole 12a through which wiring is inserted is formed on an inner peripheral side of the wave generator 12. The wave generator 12 is rotated about its own axis, which is a rotation center, by a drive shaft. The driving device is disposed on one side (the right in FIG. 1) of the wave generator 12 in the axial direction X. Hereinafter, one side in the axial direction X will be referred to as an input side, and the other side (the left in FIG. 1) will be referred to as a counter input side.

The wave generator 12 has an intermediate shaft portion 12b, an input-side shaft portion 12c which is on the input side of the intermediate shaft portion 12b, and a counter input-side shaft portion 12d which is on the counter input side of the intermediate shaft portion 12b. An outer peripheral shape of the intermediate shaft portion 12b, in a cross section perpendicular to the axial direction X, is an elliptical shape. Outer peripheral shapes of the input-side shaft portion 12c and the counter input-side shaft portion 12d, in a cross section perpendicular to the axial direction X, are a circular shape. The "ellipse" in the specification is not limited to an ellipse in a geometrically strict sense, but also includes a substantially ellipse.

The external gear 14 is disposed on an outer peripheral side of the intermediate shaft portion 12b of the wave generator 12. The external gear 14 is a flexible tubular member. The external gear 14 has a tubular base portion 14a, and a first external tooth portion 14b and a second external tooth portion 14c, which are formed integrally with the base portion 14a on the outer peripheral side of the base portion 14a. The first external tooth portion 14b is disposed on the input side in the axial direction X, and meshes with the decelerating internal gear 18-A to be described later. The second external tooth portion 14c is disposed on the counter input side in the axial direction X, and meshes with the output internal gear 18-B to be described later. Both side portions of the first external tooth portion 14b and the second external tooth portion 14c in a long axis direction of the intermediate shaft portion 12b of the wave generator 12 mesh with the internal gear 18.

When the wave generator 12 rotates, the external gear 14 is flexibly deformed to be elliptical by the intermediate shaft portion 12b of the wave generator 12 via the wave generator bearing 16. In this case, the external gear 14 is flexibly deformed to follow a shape of the intermediate shaft portion 12b of the wave generator 12 while changing a meshing position with the internal gear 18-A in the circumferential direction.

The wave generator bearing 16 is disposed between the intermediate shaft portion 12b of the wave generator 12 and the external gear 14. The wave generator bearing 16 includes a first wave generator bearing 16-A disposed between the first external tooth portion 14b of the external gear 14 and the wave generator 12 and a second wave generator bearing 16-B disposed between the second external tooth portion 14c of the external gear 14 and the wave generator 12. The wave generator 12 rotatably supports the external gear 14 via the wave generator bearing 16.

Each wave generator bearing 16 has a plurality of first rolling elements 16a, a first inner ring 16b, and a first outer ring 16c. Although the rolling elements 16a of the embodiment each area sphere, the rolling elements may be a roller. Although the first inner ring 16b of the embodiment is formed by an outer peripheral surface of the intermediate shaft portion 12b of the wave generator 12, the first inner ring may be formed by a member different from the wave generator 12. The first outer ring 16c has flexibility. When the wave generator 12 rotates, the first outer ring 16c is flexibly deformed to be elliptical by the intermediate shaft portion 12b of the wave generator 12 via the first rolling elements 16a.

The internal gear 18 is a stiff annular portion. The internal gear 18 is disposed on the outer peripheral side of the first external tooth portion 14b and the second external tooth portion 14c of the external gear 14. The internal gear 18 of the embodiment includes the decelerating internal gear 18-A (first internal gear) disposed on the input side in the axial direction X and the output internal gear 18-B (second internal gear) disposed on the counter input side in the axial direction X.

The decelerating internal gear 18-A has a first internal tooth portion 18a with which the first external tooth portion 14b of the external gear 14 meshes. The number of internal teeth of the first internal tooth portion 18a is larger than the number of external teeth of the first external tooth portion 14b by $2i$ (i is a natural number of 1 or more). Accordingly, when the wave generator 12 rotates, the rotation of the wave generator 12 is decelerated at a reduction ratio according to a difference in the number of teeth between the first internal tooth portion 18a and the first external tooth portion 14b, and the external gear 14 rotates. The decelerating internal gear 18-A has a connecting portion 18b in which a bolt hole, into which a bolt B1 is screwed, is formed. The bolt B1 is used for connecting the decelerating internal gear 18-A to the input-side bearing housing 22-A.

The output internal gear 18-B has a second internal tooth portion 18c with which the second external tooth portion 14c of the external gear 14 meshes. The number of internal teeth of the second internal tooth portion 18c is the same as the number of external teeth of the second external tooth portion 14c. Accordingly, when the wave generator 12 rotates, the output internal gear 18-B outputs rotation at the same speed as an axial rotation component of the external gear 14.

The support member 20 has an outer tubular portion 20a that rotatably supports the output internal gear 18-B via a main bearing 24. The outer tubular portion 20a is disposed radially outside the first internal tooth portion 18a of the decelerating internal gear 18-A. The support member 20 and the decelerating internal gear 18-A of the embodiment configure a part of a single member and are integrated with each other. An insertion hole 20b for inserting a bolt (not illustrated) used for connection to an external member is formed in the outer tubular portion 20a. The external member is disposed outside the gear device 100 and has a role of supporting the gear device 100.

The main bearing 24 has a plurality of second rolling elements 24a, a second inner ring 24b, and a second outer ring 24c. Although the second rolling elements 24a of the embodiment each are a sphere, the second rolling elements may be a roller. Although the second inner ring 24b of the embodiment is formed by an outer peripheral surface of the output internal gear 18-B, the second inner ring may be formed by a member different from the output internal gear 18-B. Although the second outer ring 24c is formed by an outer peripheral surface of the outer tubular portion 20a of the support member 20, the second outer ring may be configured by a member different from the support member 20.

The bearing housings 22 are disposed at an interval in the axial direction X of the wave generator 12. The bearing housings 22 include the input-side bearing housing 22-A disposed on the input side in the axial direction X and the counter input-side bearing housing 22-B disposed on the counter input side in the axial direction X.

The input-side bearing housing 22-A is integrated by being connected to the decelerating internal gear 18-A by the bolt B1. The input-side bearing housing 22-A is connected to the decelerating internal gear 18-A and functions as a first abutment member that comes into contact with an input-side end surface of the external gear 14.

The counter input-side bearing housing 22-B is integrated by being connected to the output internal gear 18-B by a bolt B2. The counter input-side bearing housing 22-B is connected to the output internal gear 18-B and functions as a second abutment member that comes into contact with a counter input-side end surface of the external gear 14.

A bearing 26 is disposed between the input-side bearing housing 22-A and the input-side shaft portion 12c of the wave generator 12, and between the counter input-side bearing housing 22-B and the counter input-side shaft portion 12d of the wave generator 12. The pair of bearing housings 22-A and 22-B rotatably supports both sides of the wave generator 12 via the bearings 26. Each bearing 26 has a plurality of third rolling elements 26a, a third inner ring 26b, and a third outer ring 26c.

The counter input-side bearing housing 22-B and the output internal gear 18-B are connected to a driven device using a bolt (not illustrated). The driven device is disposed on the counter input side of the wave generator 12 in the axial direction X. An insertion hole 22a, through which a shaft portion of the bolt (not illustrated) is inserted, is formed in the counter input-side bearing housing 22-B. A female screw hole 18d into which the bolt is screwed is formed in the output internal gear 18-B.

The operation of the gear device 100 will be described. When the wave generator 12 rotates in response to the rotation of the drive shaft of the driving device, the external gear 14 is flexibly deformed continuously to follow the shape of the intermediate shaft portion 12b of the wave generator 12 while changing a meshing position with the internal gear 18 in the circumferential direction. The first external tooth portion 14b rotates relatively (rotates) to the decelerating internal gear 18-A by an amount corresponding to a difference in the number of teeth from the first internal tooth portion 18a of the decelerating internal gear 18-A for one rotation of the wave generator 12. In this case, the rotation of the wave generator 12 is decelerated at a reduction ratio according to the difference in the number of teeth from the first internal tooth portion 18a, and the external gear 14 rotates. The second internal tooth portion 18c of the output internal gear 18-B has the same number of teeth as the second external tooth portion 14c. Thus, the output internal gear 18-B rotates in synchronization with an axial rotation component which is the same as the second external tooth portion 14c without changing a relative meshing position with the second external tooth portion 14c around when the wave generator 12 has made one rotation. The rotation of the output internal gear 18-B is transmitted from the output internal gear 18-B to the driven device. As a result, the rotation of the wave generator 12 is decelerated and output from the output internal gear 18-B to the driven device.

Herein, in the gear device 100 of the embodiment, the internal gear 18 is made of a resin, and the external gear 14 is made of a material having a smaller linear expansion coefficient than the resin of the internal gear 18 (hereinafter, a "low expansion material"). That is, each of the decelerating internal gear 18-A and the output internal gear 18-B is made of a resin. In the embodiment, the decelerating internal gear 18-A, as well as the support member 20, is made of a resin. For example, general-purpose engineer plastics such as polyacetal, polyamide, and PEEK can be used as the resin for the internal gear 18, and a composite material with carbon fiber or a bake material can also be used.

In addition, the external gear 14 is made of a low expansion material. Specifically, the entire external gear 14, that is, each of the base portion 14a, the first external tooth portion 14b, and the second external tooth portion 14c is made of a low expansion material. For example, a metal such as iron and aluminum can be adopted as the low expansion material of the external gear 14. The external gear 14 may be made of other resins having a smaller linear expansion coefficient than the resin of the internal gear 18.

Although materials for members other than the internal gear and the external gear are not particularly limited, the input-side bearing housing 22-A and the counter input-side bearing housing 22-B are made of a resin, and the wave generator 12, each bearing, and each bolt are made of a metal in the embodiment. In particular, as the wave generator 12 and the wave generator bearing 16 are made of a metal in addition to the external gear 14, heat generated at a meshing portion between the internal gear 18 and the external gear 14 can be transmitted to the external gear 14, the wave generator bearing 16, and the wave generator 12 in order of having high thermal transmittance, and can be released to the outside.

When a place where the internal gear 18 and the external gear 14 are meshed with each other generates heat at the time of use of the gear device 100, a thermal expansion amount of the internal gear 18 is larger than a thermal expansion amount of the external gear 14. For this reason, a difference in a pitch circle diameter (PCD) between the internal gear 18 and the external gear 14 increases due to a difference in the thermal expansion amount. When the difference in the PCD increases, a circumferential gap between the teeth of the internal gear 18 and the teeth of the external gear 14 increases, and lost motion increases.

The PCDs of the internal gear 18 and the external gear 14 will be described. In the specification, a PCD of a gear is defined as a diameter of a circle passing through a center between a tooth tip and a tooth bottom.

Figure 2:
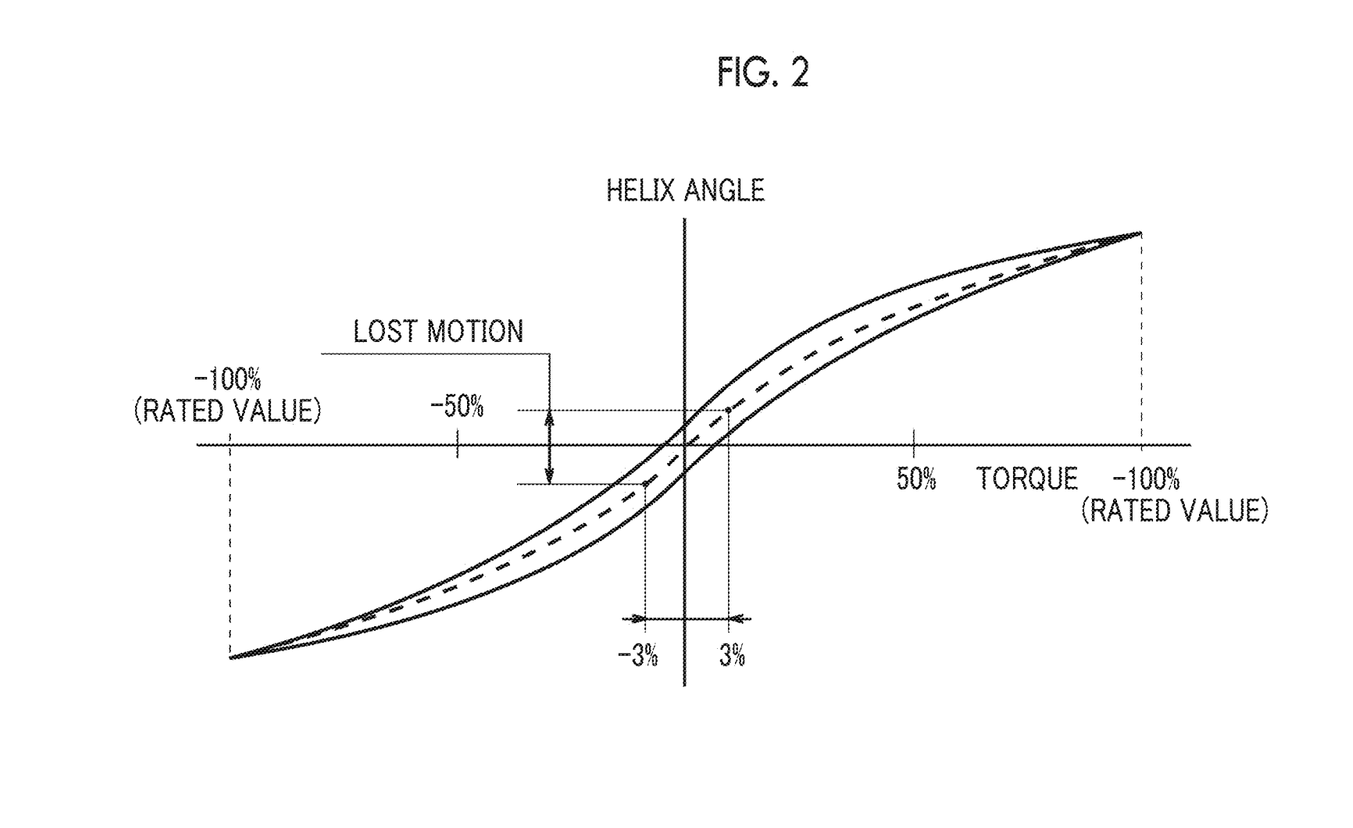
FIG. 2 is a graph showing lost motion of the gear device of FIG. 1.

The lost motion of the gear device 100 will be described. FIG. 2 is a graph showing lost motion. Lost motion is defined as follows in the specification. The wave generator 12 (high-speed shaft) of the gear device is fixed, and a load is slowly applied up to rated torque from a side of the counter input-side bearing housing 22-B (low-speed shaft). The load until the load is removed and the displacement (helix angle) of the low-speed shaft are measured. When this relationship is measured, a hysteresis curve of stiffness shown in FIG. 2 is obtained. Lost motion is defined as a helix angle at rated torque of ±3% point.

The lost motion of the embodiment will be described. As described above, insofar as the lost motion of the gear device 100 at the time of use is within a range of 0 min or more to 15 min or less, the gear device can also be used for applications requiring high accuracy. For this reason, in the embodiment, a difference $\Delta D$ in the PCD between the internal gear 18 and the external gear 14 before use of the gear device 100 is set such that the lost motion at the time of use is 0 min or more and 15 min or less. The difference $\Delta D$ is a difference obtained by subtracting the PCD of the external gear 14 from the PCD of the internal gear 18. When positive, it means that the PCD of the internal gear 18 is larger than the PCD of the external gear 14. When negative, it means that the PCD of the internal gear 18 is smaller than the PCD of the external gear 14.

Hereinafter, an example of a process of setting the difference $\Delta D$ in the PCD between the internal gear 18 and the external gear 14 in order to keep the lost motion at the time of use within a predetermined range will be described. When the lost motion at the time of use is smaller than 0 min, a torque loss of the gear device 100 is large. Therefore, the lost motion at the time of use is set to 0 min or more. The PCD in the embodiment is a PCD in a state before the internal gear 18 and the external gear 14 are assembled into the gear device 100 (a single component state).

Figure 3:
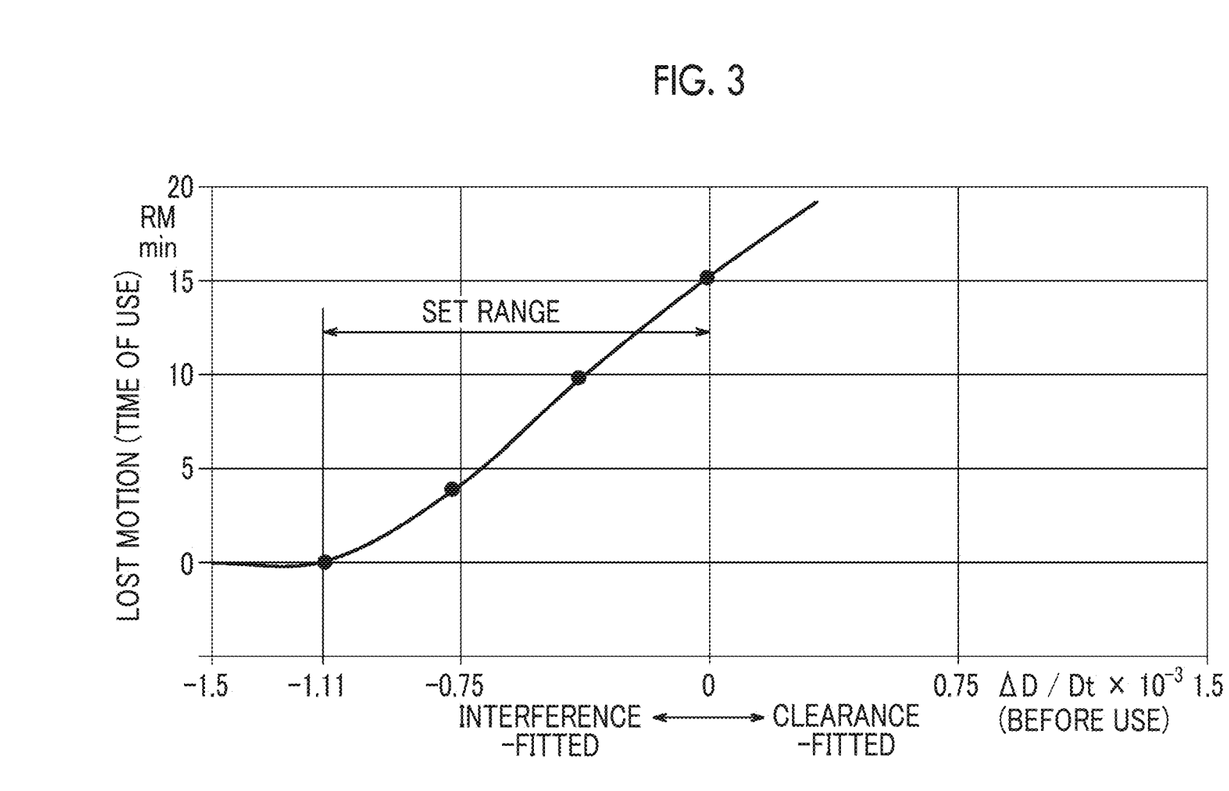
FIG. 3 is a graph showing a relationship between a difference in a PCD between an external gear and an internal gear of the gear device of FIG. 1 and the lost motion.

FIG. 3 is a graph showing a relationship between the difference $\Delta D$ in the PCD between the internal gear 18 and the external gear 14 before use and lost motion RM at the time of use. The graph is acquired by simulating the difference $\Delta D$ in the PCD and the lost motion RM. The horizontal axis of the graph shows a ratio $\Delta D/Dt$ obtained by dividing the difference $\Delta D$ in the PCD between the internal gear 18 and the external gear 14 before use (at 20° C. in the embodiment) by Dt which is the PCD of the internal gear 18. The vertical axis of the graph shows the magnitude of the lost motion RM of the gear device 100 at the time of use (50° C. in the embodiment). It is clear from FIG. 3 that lost motion at the time of use is 15 min or less in a case where the ratio $\Delta D/Dt$ is 0 or less before use.

The ratio $\Delta D/Dt$ before use can be identified from design values of the internal gear and the external gear. A temperature rise amount at the time of use can be acquired through experiments. In the embodiment, a temperature of the gear device 100 is obtained by measuring a temperature of an outer periphery of a member integrated with the internal gear. Specifically, a temperature of an outer periphery of the support member 20 is measured. This point is the same in other embodiments. In this example, a temperature rise amount is 20° C. to 30° C., and 30° C. is used in the simulation.

Similarly, the ratio $\Delta D/Dt$ before use for setting lost motion at the time of use to 0 min or more can be acquired.

In this example, the ratio $\Delta D/Dt$ before use is identified to be −0.0011 or more. In addition, the ratio $\Delta D/Dt$ before use for setting lost motion at the time of use to 15 min or less can be acquired. In this example, the ratio $\Delta D/Dt$ before use is identified to be 0 or less. From these, by setting the ratio $\Delta D/Dt$ before use in a range of −0.0011 to 0, lost motion at the time of use can be set to 0 min or more and 15 min or less. This setting process is an example, and the ratio $\Delta D/Dt$ before use may be set through other processes insofar as lost motion at the time of use can be set to 0 min or more to 15 min or less.

As described above, by making the PCD of the internal gear 18 small compared to the PCD of the external gear 14 (=making the ratio $\Delta D/Dt$ smaller), lost motion at the time of use can be made small. However, a tooth surface pressure Pf received by a tooth surface becomes excessive depending on the ratio $\Delta D/Dt$, and thereby it is conceivable that the reliability of the gear device 100 also reduces. For this reason, the present inventor has examined a relationship between the ratio $\Delta D/Dt$ and the tooth surface pressure Pf.

Figure 4:
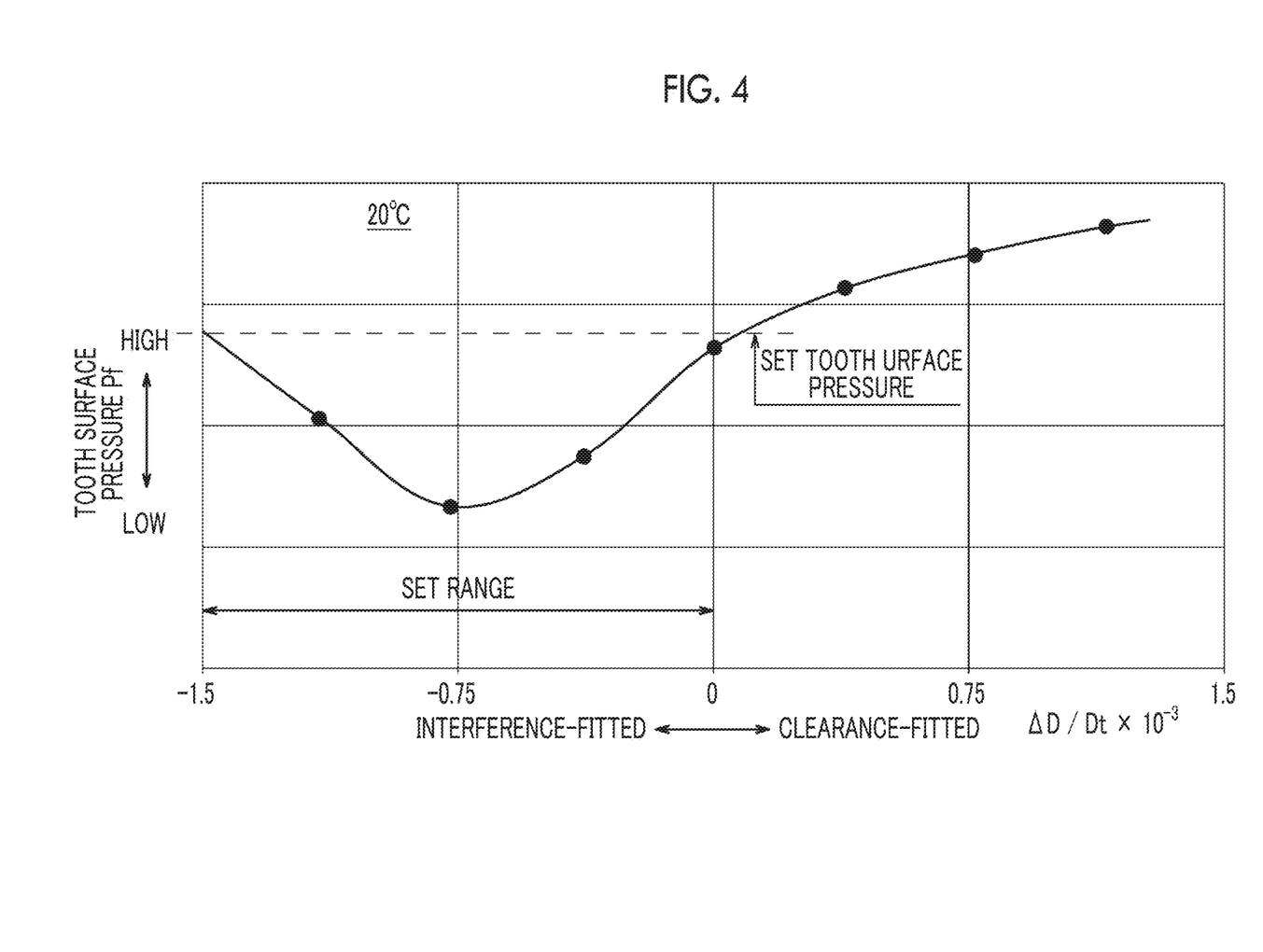
FIG. 4 is a graph showing a relationship between the difference in the PCD between the external gear and the internal gear of the gear device of FIG. 1 and a tooth surface pressure.

FIG. 4 is a graph showing a relationship between the difference $\Delta D$ in the PCD between the internal gear 18 and the external gear 14 and the tooth surface pressure Pf received by the tooth surface. In the graph, a temperature before use is set to 20° C., and the ratio $\Delta D/Dt$ and the tooth surface pressure Pf at that time are acquired through simulations. The horizontal axis of the graph shows the ratio $\Delta D/Dt$. The vertical axis of the graph shows the magnitude of the tooth surface pressure Pf received by the tooth surface of the internal gear 18. The graph shows that the higher the tooth surface, the higher the tooth surface pressure Pf, and the lower the tooth surface, the lower the tooth surface pressure Pf.

As shown in FIG. 4, when the ratio $\Delta D/Dt$ increases, the number of meshing teeth decreases by that amount, thereby increasing a pressure applied to one tooth. Thus, the tooth surface pressure Pf increases. When the ratio $\Delta D/Dt$ decreases, the number of meshing teeth increases by that amount, thereby decreasing a pressure applied to one tooth. Thus, the tooth surface pressure Pf decreases. However, in a region where the ratio $\Delta D/Dt$ is negative, it is found that the internal gear 18 and the external gear 14 are interference-fitted to each other, and the tooth surface pressure P increases due to an increase in interference.

Therefore, it is desirable to set the ratio $\Delta D/Dt$ within a range where the tooth surface pressure Pf does not become excessive. From a perspective of the tooth surface pressure Pf, the difference $\Delta D$ in the PCD between the internal gear 18 and the external gear 14 may be set within a range where the tooth surface pressure Pf before use does not exceed a predetermined value. For example, the ratio $\Delta D/Dt$ before use can be set within a range of −0.0015 to 0. In a case where the range is different from a range set from a perspective of lost motion at the time of use, the ratio $\Delta D/Dt$ may be set within a range where the ranges overlap each other.

In the embodiment, even when a temperature rises due to the use of the gear device 100 by setting the PCDs of the internal gear 18 and the external gear 14 before use as describe above, lost motion can be kept within the range of 0 min or more to 15 min or less. In this case, it is possible to respond to applications requiring high accuracy.

In the gear device 100 configured as described above, the PCD of the external gear 14 may be larger than the PCD of the internal gear 18 before use. Also in a case where the PCD of the external gear 14 is larger than the PCD of the internal gear 18, it is confirmed that the gear device can be operated as a gear device that is comparable to a case of clearance-fitting. In this configuration, since the external gear 14 and the internal gear 18 are in an interference-fitted state before use, lost motion can be kept within a predetermined range even when a temperature rises at the time of use.

Another Embodiment

The gear device 100 according to another embodiment of the present invention will be described. In the drawings and description of another embodiment, components and members which are the same or equivalent to the one embodiment will be assigned with the same reference symbols. Description overlapping the one embodiment will be omitted as appropriate.

The gear device 100 of the embodiment is a gear device including the internal gear 18 and the external gear 14 that meshes with the internal gear 18. The internal gear 18 is made of a resin. The external gear 14 is made of a material having a smaller linear expansion coefficient than the resin. The PCD of the external gear 14 is set to be larger than the PCD of the internal gear 18 in a state where the temperature of the gear device 100 is 20° C. such that and lost motion becomes 0 min or more and 15 min or less in a range of the temperature of the gear device 100 of 40° C. or more and 50° C. or less.

For example, based on the linear expansion coefficients of the materials for the external gear 14 and the internal gear 18, a temperature difference between 20° C. (at the time of a low temperature) and 40° C. or more and 50° C. or less (at the time of a high temperature), and the lost motion of the gear device 100 at the time of a high temperature (0 min or more and 15 min or less), the PCDs of the external gear 14 and the internal gear 18 at the time of a low temperature are determined. In this case, the PCD of the external gear 14 at the time of a low temperature is set to be larger than the PCD of the internal gear 18. A relationship between the PCDs of the external gear 14 and the internal gear 18 and lost motion can be identified through simulations or experiments as in the example of FIG. 3.

In the embodiment, since the external gear 14 and the internal gear 18 are in an interference-fitted state at 20° C., lost motion can be kept within the range of 0 min or more to 15 min or less even when a temperature rises to 40° C. or more and 50° C. or less at the time of use. In this case, it is possible to respond to general-purpose applications.

Another embodiment has been described hereinbefore.

Further Embodiment

A manufacturing method S200 for a gear device according to a further embodiment of the present invention will be described. In the drawings and description of the further embodiment, components and members which are the same or equivalent to the one embodiment will be assigned with the same reference symbols. Description overlapping the one embodiment will be omitted as appropriate. The manufacturing method S200 of the embodiment is a method of manufacturing the gear device 100 described above, and includes a fitting step of fitting the external gear 14 into the internal gear 18 in an interference-fitted state.

In this form, since the external gear 14 and the internal gear 18 are fitted into each other in an interference-fitted state, lost motion can be kept small even when there is thermal expansion at the time of use.

In the fitting step described above, fitting may be performed after the internal gear 18 is heated. In this case, when the internal gear 18 is heated, the PCD of the internal gear 18 increases due to thermal expansion, and the fitting becomes easy. In addition, since the fitting can be easily performed, the internal gear 18 and the external gear 14 can be prevented from being damaged at the time of fitting. A dryer or an oven can be used in heating the internal gear 18. A heating temperature of the internal gear 18 can be set through simulations or experiments.

In the fitting step described above, fitting may be performed after the external gear 14 is cooled. In this case, when the external gear 14 is cooled, the PCD of the external gear 14 decreases due to contraction, and fitting is easily performed. In addition, since the fitting can be easily performed, the internal gear 18 and the external gear 14 can be prevented from being damaged at the time of fitting. Liquid nitrogen or dry ice can be used in cooling the external gear 14. A cooling temperature of the external gear 14 can be set through simulations or experiments.

The further embodiment has been described hereinbefore.

Hereinbefore, examples of the embodiments of the present invention have been described in detail. All the embodiments described above are merely specific examples for executing the present invention. The content of the embodiments does not limit the technical scope of the present invention, and it is possible to make many design changes, such as component change, addition, and deletion, without departing from the gist of the invention defined in the claims. Although content which is possible to undergo such design changes is described with expressions such as "of the embodiment" and "in the embodiment" in the embodiments described above, it does not mean that design changes are not allowed for content without such expressions. In addition, hatching attached to the cross sections of the drawing does not limit a material for a hatched object.

Hereinafter, a modification example will be described. In the drawings and description of the modification example, components and members which are the same or equivalent to the embodiments will be assigned with the same reference symbols. The description overlapping the embodiments will be omitted as appropriate, and a configuration different from the embodiments will be mainly described.

Modification Example

Although an example in which the PCD of the external gear is larger than the PCD of the internal gear before assembly (in a single item state) is given in the description of the one embodiment, the present invention is not limited thereto. For example, in a case where the main bearing 24 has an inner ring, the PCD of the external gear before assembly may be made smaller than the PCD of the internal gear. In this case, the inner ring of the main bearing 24 can be externally fitted to the internal gear 18-B on an output side by interference-fitting, the internal gear 18-B can be deformed radially inward, and the PCD of the external gear after being assembled into the gear device can be made larger than the PCD of the internal gear.

Although an example in which the gear device is a bending meshing type speed reducer (referred to as a wave gear device) having a tubular external gear is given in the description of the one embodiment, the present invention is not limited thereto. For example, the gear device may be a cup-type or silk hat-type bending meshing type speed reducer.

Although an example in which the gear device is a flexible mesh type speed reducer is given in the description of the one embodiment, the present invention is not limited thereto, and can be applied to various gear devices having an internal gear and an external gear that mesh with each other. For example, the gear device may be a so-called center crank type eccentric oscillation type gear device, a so-called distribution type eccentric oscillation type speed reducer in which a plurality of crankshafts are disposed at positions offset from an axial center of an internal gear, and a simple planetary gear.

Although the method of fitting after cooling the external gear 14 and the method of fitting after heating the internal gear 18 have been described in the further embodiment, the cooled external gear 14 may be fitted into the heated internal gear 18. In this case, fitting can be more easily performed.

Each modification example described above has the same operation and effects as the embodiments described above.

Any combination of each of the embodiments and the modification example described above is also useful as an embodiment of the present invention. A new embodiment generated by combination has each of the effects of the combined embodiments and modification example.

It should be understood that the invention is not limited to the above-described embodiment, but may be modified into various forms on the basis of the spirit of the invention. Additionally, the modifications are included in the scope of the invention.

What is claimed is:

1. A gear device comprising:
an internal gear; and
an external gear that meshes with the internal gear,
wherein the internal gear is made of a resin,
the external gear is made of a material having a smaller linear expansion coefficient than the resin, and
pitch circle diameters of the internal gear and the external gear before use of the gear device are set such that lost motion becomes 0 minutes or more and 15 minutes or less due to a difference in a thermal expansion amount between the internal gear and the external gear at a time of use of the gear device.

2. The gear device according to claim 1,
wherein the internal gear has a decelerating internal gear and an output internal gear, and
the external gear has a tubular base portion, and a first external tooth portion and a second external tooth portion, which are formed integrally with the base portion.

3. The gear device according to claim 2,
wherein the first external tooth portion meshes with the decelerating internal gear, and
the second external tooth portion meshes with the output internal gear.

4. The gear device according to claim 1, further comprising:
a wave generator,
wherein the external gear is disposed on an outer peripheral side of an intermediate shaft portion of the wave generator.

5. The gear device according to claim 4,
wherein the wave generator is a stiff tubular member and includes the intermediate shaft portion, an input-side shaft portion, and a counter input-side shaft portion.

6. The gear device according to claim 5,
wherein an outer peripheral shape of the intermediate shaft portion, in a cross section perpendicular to an axial direction, is an elliptical shape, and
outer peripheral shapes of the input-side shaft portion and the counter input-side shaft portion, in a cross section perpendicular to the axial direction, are a circular shape.

7. The gear device according to claim 1, further comprising:
a wave generator bearing that is disposed between an intermediate shaft portion of the wave generator and the external gear.

8. The gear device according to claim 7,
wherein the wave generator bearing has a plurality of rolling elements, an inner ring, and an outer ring.

9. The gear device according to claim 8,
wherein the rolling element is a sphere.

10. The gear device according to claim 8,
wherein the inner ring is formed by an outer peripheral surface of the intermediate shaft portion of the wave generator.

11. The gear device according to claim 8,
wherein the outer ring has flexibility.

12. The gear device according to claim 1,
wherein the pitch circle diameters of the internal gear and the external gear, which are in a state where the internal gear and the external gear are assembled into the gear device and before use of the gear device, are set.

13. The gear device according to claim 12,
wherein in a state where the internal gear and the external gear are assembled into the gear device and before use of the gear device, the pitch circle diameters of the external gear is larger than the pitch circle diameters of the internal gear.

14. The gear device according to claim 1,
wherein in a state before the internal gear and the external gear are assembled into the gear device, the pitch circle diameters of the external gear is larger than the pitch circle diameters of the internal gear.

15. A gear device comprising:
an internal gear; and
an external gear that meshes with the internal gear,
wherein the internal gear is made of a resin,
the external gear is made of a material having a smaller linear expansion coefficient than the resin, and
a pitch circle diameter of the external gear is set to be larger than a PCD of the internal gear in a state where a temperature of the gear device is 20° C. such that lost motion becomes 0 minutes or more and 15 minutes or less in a range of the temperature of the gear device of 40° C. or more and 50° C. or less.

16. A manufacturing method for a gear device including an internal gear and an external gear that meshes with the internal gear are included, the internal gear being made of a resin, and the external gear being made of a material having a smaller linear expansion coefficient than the resin, the method comprising:
a fitting step of fitting the external gear into the internal gear in an interference-fitted state.

17. The manufacturing method for a gear device according to claim 16,
wherein in the fitting step, the internal gear is heated and then fitted.

18. The manufacturing method for a gear device according to claim 16,
wherein in the fitting step, the external gear is cooled and then fitted.

* * * * *